Patented Apr. 5, 1949

2,466,138

UNITED STATES PATENT OFFICE 2,466,138

REFRACTORY MOLD COMPOSITION

Eugene Wainer, Niagara Falls, N. Y., assignor, by mesne assignments, to National Lead Company, New York, N. Y., a corporation of New Jersey No Drawing. Application September 20, 1944, Serial No. 555,045

8 Claims. (Cl. 106—57)

This invention relates to quick air-setting refractory compositions, and particularly to such refractory compositions for use as molds for the precision casting of metal parts. By the term "refractory composition" is meant a composition which upon firing at an elevated temperature forms a coherent refractory mass. This is a continuation-in-part of application for patent Serial Number 412,690, filed September 27, 1941, now Patent No. 2,372,236 of March 27, 1945.

Refractory slips suitable for the precision casting of metals, such as for use in dentistry, tools, dies, molds, gears, etc., must have a surprisingly large number of very precise and controllable chemical and physical properties. For example, the water or liquid content should be such that the cement flows easily; the cement should remain fluid for several minutes after mixture; it should not evolve gas bubbles; it should set up and harden in several minutes after casting without excessive evolution of heat to a strong tough mass accurately reproducing every detail of the model; on setting, it should undergo a slight and controllable setting expansion; on heating to elevated temperatures it should expand to a definite value at a definite temperature according to the type of metal being cast; and the metal on cooling should have a smooth surface and undergo no reaction of any nature with the refractory, either chemical or the development of gas forming blowholes. Further, an ideal refractory composition will work with a wide variety of casting metals such as brasses, bronzes, aluminum alloys, zinc alloys, non-ferrous alloys generally, chromium-cobalt-tungsten alloys, steels, stainless steels, etc. Thus, it should be capable of withstanding the high temperatures necessary for casting alloys of high melting point, such as certain chromium alloys. Also, the ideal refractory should be capable of assembly in dry powder form, shelf stable for an indefinite period, requiring only the addition of water in specified amount to yield the desired properties.

It is therefore an object of this invention to provide a refractory composition for casting metals which can be completely compounded in dry form and which requires only the addition of water for application.

It is another object to provide such a composition which is susceptible to any desired variation for any type of metal casting, such as variation in setting time, setting expansion, etc.

It is a further object to provide such a composition which will permit the use of a wide variety of refractory grains and permit also the casting of perfectly clean metal with clean bright surfaces from which the refractory is easily removed.

It is a still further object to provide such a composition which can be used for the casting of most ferrous and non-ferrous compositions including chrome-cobalt-tungsten alloys, copper, silver, gold, steel, stainless steel, brasses, bronzes, white metals, etc. Other objects will appear hereinafter.

These objects are accomplished by means of a dry refractory composition containing a refractory aggregate, dead burned magnesite and a solid water-soluble acid phosphate. The refractory aggregate is generally incorporated in the dry composition in a particle size range of —100 to —200 mesh. In this degree of fineness a form or mold can be prepared of not too great porosity and one which will produce cast objects therein having excellent surface characteristics. In general, the amount of aggregate included in the composition with the dead burned magnesite and acid phosphate should consist of a substantial portion of the total composition since the amount of aggregate to some degree regulates the shelf stability of the final dry composition. In general, the aggregate should constitute from about 20% to 50% or more of the finished product and additional aggregate may be added to the composition or to the subsequent slurry prior to setting. The type of aggregate employed may be dictated to some extent by the use to which the subsequent mold is to be put. Thus, the usual refractory materials such as silica, zircon, aluminum silicates, fused alumina, cyanite, feldspar, granites, as well as other commercially employed refractories, are eminently satisfactory. For most purposes, the usual refractories such as silica, zircon and alumina are preferred.

The magnesia is best employed as dead burned magnesite and, for best results, magnesites containing several percent of iron oxide and silica are necessary, magnesites containing 5 to 15% iron oxide and 3 to 10% silica being suitable. It is believed that the presence of these materials produces some slight fluxing and imparts shelf stability to the resultant material in contrast with pure magnesium oxide which will harden in the bag within a period of days. If dead burned magnesite is not available, additions of iron and silica should be made to the pure magnesia and the whole dead burned (1400° C.). The dead burned magnesite, however, should contain at least about 70% MgO. While the magnesia may be ground by either wet or dry procedures, dry milled —200 mesh is preferred.

Ammonium diacid phosphate of the chemical formula NH₄H₂PO₄ is found to be most satisfactory as the reactant for the dead burned magnesite to produce air-setting properties upon the addition of water to the dry composition. This well crystallized salt of commerce may be suitably ground to a fine state of subdivision in which form it is readily admixed with the aggregate and dead burned magnesite. The amount of acid phosphate employed should be sufficient to produce with the magnesium oxide that quantity of magnesium phosphate sufficient to produce hardness and rigidity in the final cast. In general, the amount of acid phosphate will be equal to or somewhat greater than the amount of magnesium oxide in the mixture, a slight excess being employed to increase the time of initial set.

In mixing the composition in a form where it can be suitably bagged and shipped and remain stable for long periods of time without hardening or setting, the burned magnesite is preferably mixed with about half of the refractory aggregate to be finally included. The remaining refractory aggregate is then mixed with the acid phosphate and the two batches subsequently compounded in any convenient form of mixing equipment. In general, the finished product will contain from 20 to 50% aggregate although the bonding properties are not lost even when two or three times the actual cement weight of inert refractory material is added to the bond.

It is preferable to prepare a bagged material containing about equal amounts by weight of dead burned magnesite, aggregate and acid phosphate.

In order to use the mixed material, the dry composition may be added to a measured amount of water sufficient to give the consistency of slurry desired, and stirred to a creamy paste in which form the paste may be shaped into the desired mold and will set in from 5 to 15 minutes with a final set in from 20 to 30 minutes. It will be understood that within these limits the initial time of set may be modified to some extent by increasing the amount of aggregate or by variations in the proportion of the burned magnesite and acid phosphate. These variations are shown to some extent in the following examples which are listed merely as illustrative of the invention and not limitative thereof:

Example I

| | Grams |
|---|---|
| —140 mesh silica | 300 |
| Ammonium acid phosphate ground to 5%+200 mesh | 300 |
| Dead burned magnesite containing Fe₂O₃ and SiO₂ ground to 5%+200 mesh | 300 |

The acid phosphate is mixed with 150 grams of the silica, and the magnesite is mixed with the remaining silica. The whole batch is then mixed together. The batch is then added to 100 cc. of water, thoroughly stirred until smooth, and cast. This cement will remain fluid for about 5 minutes and reach final set in about 20 minutes.

Example II

| | Grams |
|---|---|
| 200 mesh zircon | 300 |
| Magnesite as in Example 1 | 300 |
| NH₄H₂PO₄ as in Example 1 | 300 |

This mixture is prepared and handled as in Example 1.

Example III

| | Grams |
|---|---|
| 140 mesh silica | 300 |
| Magnesite as in Example 1 | 250 |
| NH₄H₂PO₄ as in Example 1 | 350 |

Mixing as in Example 1 and using 110 cc. of water a working time of 10 to 15 minutes is obtained with final set in about 30 minutes.

Example IV

Same as in Example 3 except that —200 mesh zircon is substituted for the silica.

Example V

Same as in Example 1 except that —140 mesh alumina is substituted for the silica.

No shelf stability was obtained by the employment of pure magnesia. Thus a composition containing the following:

| | Grams |
|---|---|
| —140 mesh silica | 300 |
| Ammonium acid phosphate ground to 5%+200 mesh | 300 |
| Pure MgO | 300 | hardened in the bag in the air within three days.

Pastes or slurries made as above may be shaped to produce the desired mold form quickly and take a quick initial set in a matter of minutes. Such molds are refractory to a high degree and produce smooth castings of high fidelity.

What is claimed is:

1. A stable dry composition capable, upon the addition of water, of setting to a hard stonelike body, comprising about equal parts by weight of dead burned magnesite containing at least 70% MgO, 5 to 15% iron oxide as Fe₂O₃ and 3 to 10% SiO₂ solid water-soluble ammonium diacid phosphate and an amount of solid water-insoluble inert material which is equal to about 20% to 50% of the composition, all in finely divided form.

2. A stable dry composition capable, upon the addition of water, of setting to a hard stonelike body, comprising about equal parts by weight of dead burned magnesite containing at least 70% MgO, 5 to 15% iron oxide as Fe₂O₃ and 3 to 10% SiO₂ solid water-soluble ammonium diacid phosphate and silica aggregate, all in finely divided form.

3. A stable dry composition capable, upon the addition of water, of setting to a hard stonelike body, comprising about equal parts by weight of dead burned magnesite containing at least 70% MgO, 5 to 15% iron oxide as Fe₂O₃ and 3 to 10% SiO₂ solid water-soluble ammonium diacid phosphate and alumina aggregate, all in finely divided form.

4. A stable dry composition capable, upon the addition of water, of setting to a hard stonelike body, comprising about equal parts by weight of dead burned magnesite containing at least 70% MgO, 5 to 15% iron oxide as Fe₂O₃ and 3 to 10% SiO₂ solid water-soluble ammonium diacid phosphate and zircon aggregate, all in finely divided form.

5. A stable dry composition capable, upon the addition of water, of setting to a hard stonelike body, comprising about equal parts by weight of dead burned magnesite containing at least 70% MgO, 5 to 15% iron oxide as Fe₂O₃ and 3 to 10% SiO₂, solid water-soluble ammonium diacid phosphate and solid water-insoluble inert material, all in finely divided form.

6. A stable dry composition capable, upon the addition of water, of setting to a hard stonelike body, comprising about equal parts by weight of dead burned magnesite containing at least 70% MgO, 5 to 15% iron oxide as $Fe_2O_3$ and 3 to 10% $SiO_2$, solid water-soluble ammonium di-acid phosphate and refractory aggregate, all in finely divided form.

7. A stable dry composition capable, upon the addition of water, of setting to a hard stonelike body, comprising about equal parts by weight of dead burned magnesite containing at least 70% MgO, 5 to 15% iron oxide as $Fe_2O_3$ and 3 to 10% $SiO_2$, solid water-soluble ammonium di-acid phosphate and alumina aggregate, all in finely divided form.

8. A stable dry composition capable, upon the addition of water, of setting to a hard stonelike body, comprising about equal parts by weight of dead burned magnesite containing at least 70% MgO, 5 to 15% iron oxide as $Fe_2O_3$ and 3 to 10% $SiO_2$, solid water-soluble ammonium di-acid phosphate and zircon, all in finely divided form.

EUGENE WAINER.

REFERENCES CITED

The following references are of record in the file of this patent:

UNITED STATES PATENTS

| Number | Name | Date |
|---|---|---|
| 1,900,864 | Lowe et al. | Mar. 7, 1933 |
| 2,220,412 | Kinzie et al. | Nov. 5, 1940 |
| 2,372,236 | Wainer | Mar. 27, 1945 |

FOREIGN PATENTS

| Number | Country | Date |
|---|---|---|
| 520,138 | Germany | 1931 |